United States Patent [19]

McMillan et al.

[11] Patent Number: 4,858,099

[45] Date of Patent: Aug. 15, 1989

[54] RESONANT INVERTER

[75] Inventors: Thomas A. McMillan, Nashville; Carl A. Brooks; Alan M. Smith, both of Franklin, all of Tenn.

[73] Assignee: France/Scott Fetzer Company, Westlake, Ohio

[21] Appl. No.: 281,518

[22] Filed: Dec. 8, 1988

[51] Int. Cl.[4] .................................... H02M 7/537
[52] U.S. Cl. ................................. 363/97; 363/131
[58] Field of Search .............. 363/19, 37, 97, 131; 315/223, 224, 307

[56] References Cited

U.S. PATENT DOCUMENTS

| | | | |
|---|---|---|---|
| 3,639,826 | 2/1972 | Grundberg | 315/241 |
| 4,013,935 | 3/1977 | Siepmann et al. | |
| 4,210,792 | 7/1980 | Higuchi et al. | 219/10.49 R |
| 4,234,823 | 11/1980 | Charlot | 315/224 |
| 4,257,088 | 3/1981 | Nilssen | 363/18 |
| 4,321,507 | 3/1982 | Bosnak | 315/241 R |
| 4,333,139 | 6/1982 | Owen et al. | 363/97 |
| 4,385,262 | 5/1983 | Cambier et al. | 315/307 |
| 4,454,574 | 6/1984 | Bush et al. | 363/134 |
| 4,559,478 | 12/1985 | Fuller et al. | 315/224 |
| 4,698,741 | 10/1987 | Pacholok | 363/131 |
| 4,812,960 | 3/1989 | Sakamoto et al. | 363/97 |

FOREIGN PATENT DOCUMENTS

| | | | |
|---|---|---|---|
| 48204 | 4/1982 | Japan | 363/19 |
| 44076 | 2/1987 | Japan | |
| 147969 | 7/1987 | Japan | |

Primary Examiner—William H. Beha, Jr.
Attorney, Agent, or Firm—Pearne, Gordon, McCoy & Granger

[57] ABSTRACT

A resonant inverter is current mode-controlled with a transistor supplying current through a primary winding of a transformer. The cycle of operation includes conducting, resonating, and clamping portions of the cycle, with the transistor being turned on for the conducting portion. The resonating portion includes a storage capacitor connected to the primary winding and commences when current-responsive means of the transistor or first semiconductor turns on a second semiconductor, which in turn turns off the first semiconductor. During this resonating stage, the current in the primary winding reverses and stores energy in a storage capacitor. A clamping portion of the cycle includes a unidirectional conducting means or diode which conducts for a time for the excess energy stored in the tank circuit to return to the input and be stored in a filter capacitor.

15 Claims, 3 Drawing Sheets

RESONANT INVERTER

BACKGROUND OF THE INVENTION

A number of resonant inverters have been proposed wherein DC is converted into alternating current. U.S. Pat. Nos. 4,559,478 and 4,698,741 utilize positive feedback in a control scheme of the inverter. However, in the former patent, the transition of the power transistor from saturation to active region is used to initiate cutoff of the power transistor. In the latter-mentioned patent, a similar method is utilized with an open emitter turnoff method. In U.S. Pat. No. 4,385,262, DC current through a fluorescent lamp is controlled in each of two alternate directions through the lamp. U.S. Pat. No. 4,257,038 utilizes a single transistor in a resonant inverter, and it utilizes a saturable core feedback transformer.

SUMMARY OF THE INVENTION

The problem to be solved, therefore, is how to construct a resonant inverter wherein the inverter has more efficient switching of the power transistor despite wide variations in the input DC voltage.

This problem is solved by a resonant inverter comprising, in combination, input terminals energizable from a DC supply source and having a filter capacitor, an energy storage transformer having a primary winding, means to obtain an output from said transformer, conducting, resonating, and clamping means connected to said transformer primary winding to establish sequentially conducting, resonating, and clamping portions of repetitive cycles of operation, respectively, said conducting means including a first semiconductor connected to said primary winding to conduct current therethrough, said resonating means connected to resonate the energy in said primary winding including a storage capacitor connected to said primary winding, a second semiconductor having a control element, means responsive to the current of said first semiconductor to turn on said second semiconductor and to turn off said first semiconductor, said resonating means reversing the current in said primary winding and establishing the energy stored in the inductance of the primary winding being released into said storage capacitor, and said clamping means including unidirectional conducting means connected to establish a time for excess energy stored in the tank circuit composed of said primary winding and said storage capacitor to return to the input and be stored in said filter capacitor.

Accordingly, an object of the invention is to provide efficient switching in a resonant inverter.

Another object of the invention is to provide a current mode resonant inverter with good output regulation despite considerable variations in the input voltage.

A further object of the invention is to provide an emitter current-triggered transistor cut-off, with transistor cutoff initiated while the power transistor is still saturated.

Other objects and a fuller understanding of the invention may be had by referring to the following description and claims, taken in conjunction with the accompanying drawing.

DESCRIPTION OF THE PREFERRED EMBODIMENTS

Figure 1:
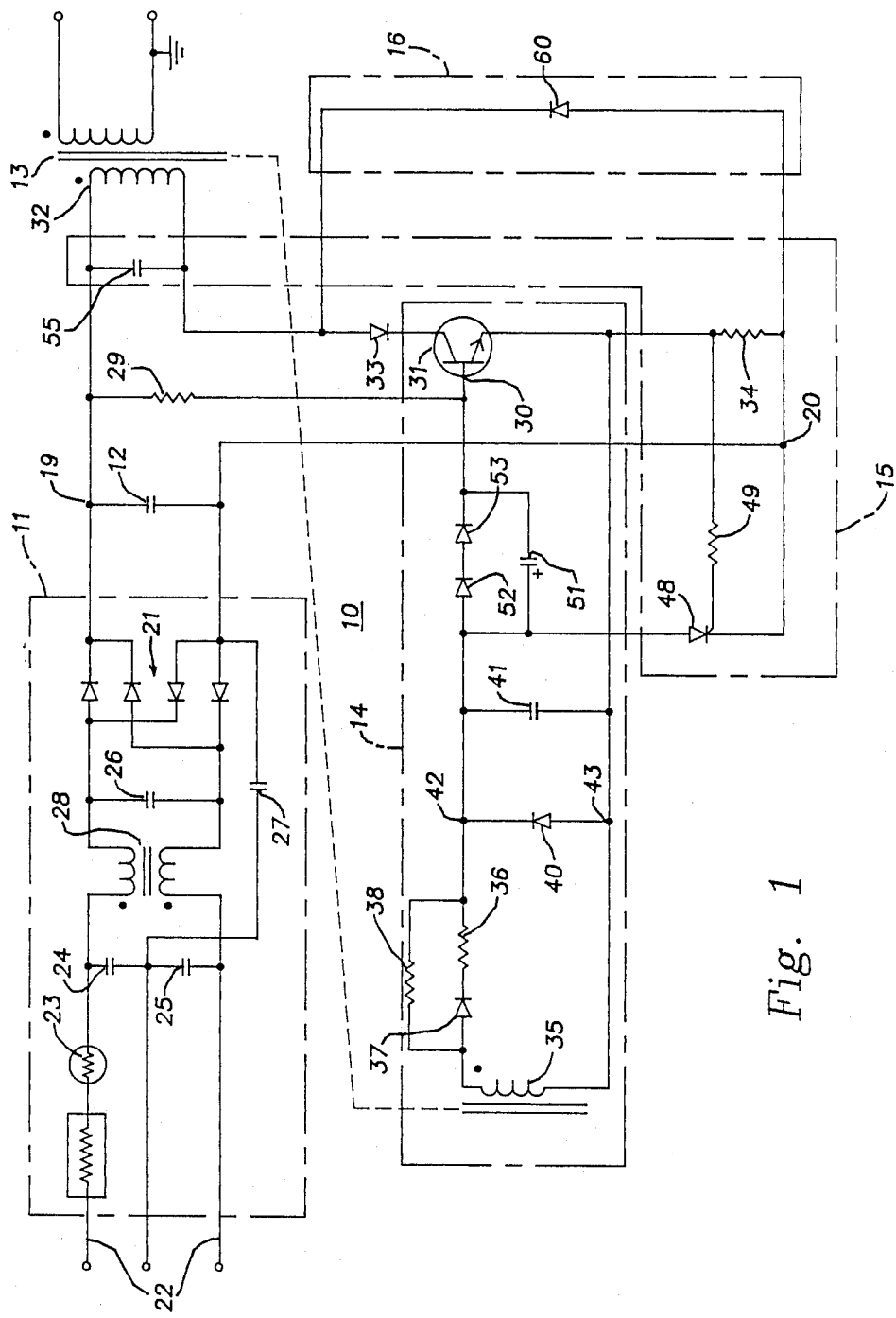
FIG. 1 is a schematic diagram of a preferred embodiment of the invention.

FIG. 1 illustrates a resonant inverter 10 which may be described as a current mode-controlled resonant inverter. This inverter has the function of changing the commercial power frequency such as 120 volts AC from a low impedance, low voltage source to a high impedance, high voltage source capable of driving a gap between electrodes. This gap may be between electrodes in a luminous tube, e.g., a neon sign, or may be between air gap electrodes for spark ignition, e.g., of an oil burner furnace.

The resonant inverter includes generally a rectifier 11, a filter capacitor 12, a transformer 13, conducting means 14, resonating means 15, and clamping means 16. The rectifier 11 may be one of many types obtaining a DC voltage at a positive terminal 19 relative to a negative terminal 20. The rectifier includes a full-wave diode bridge 21. This bridge is energized from a commercial voltage and frequency source, e.g., 120 volts AC, 60 Hertz, at terminals 22 through a thermistor 23, and a line filter composed of capacitors 24, 25, 26, 27 and inductance 28. With 120 volts AC at the input terminals 22, this provides a rectified DC voltage of about 157 volts at the positive terminal 19.

The conducting means 14, resonating means 15, and clamping means 16 provide conducting, resonating, and clamping portions of a cycle of operation. These cycles of operation are repetitive to provide an AC output to the transformer 13. The conducting stage or portion of the cycle is initiated when a first semiconductor 31 is turned on by current through a resistor 29 to the base 30, which biases the baseemitter of this semiconductor positive for current conduction. With conduction initiated, current flows from the positive terminal through a primary winding 32 of the transformer 13, through a diode 33, the first semiconductor 31, and a current sense resistor 34. The transformer 13 has a positive feedback winding 35 which almost immediately takes over from the resistor 29 in providing base drive of the transistor or first semiconductor 31. This drive current is limited by a current limiting resistor 36, which is in series with the diode 37, and this series combination is paralleled by a resistor 38. A protective diode 40 and a capacitor 41 are connected in parallel across conductors 42 and 43, with conductor 42 connected to supply the feedback winding drive current to the transistor base and conductor 43 connected to the transistor emitter. This conducting stage is one wherein the current in the primary of the transformer 13 increases linearly from time $t_0$ to time $t_1$, as shown by the graph 46 of the current shown in FIG. 2. This linearly increasing current stores energy in the magnetizing inductance of transformer 13.

The resonant stage or portion of the cycle of operation is provided by the resonating means 15 and it begins as the transistor 31 is turned off. This turnoff is initiated when the emitter current through the current sense resistor 34 develops a voltage level which satisfies the gate turn-on requirements of a second semiconductor 48, shown as a thyristor. This voltage level is supplied through a resistor 49. When the thyristor 48 turns on, the energy stored in a bias capacitor 51 during the previous conducting stage is applied to the base 30 of the transistor 31 in a direction that will provide reverse base current for efficient and rapid turnoff of this transistor 31. The reverse voltage applied by the bias capacitor 51 is determined by the forward voltage drop of a diode string, shown as diodes 52 and 53.

When the transistor 31 is turned off, the energy stored in the inductance of the primary winding 32 is released into a storage capacitor 55. The inductance value of the primary winding 32 and the value of the storage capacitor 55 will determine the time duration of the resonant cycle. This resonant cycle is shown to be about 60 microseconds in FIG. 2 for the value of the components chosen in this particular circuit of FIG. 1. The peak amplitude that the collector voltage of the transistor 31 will reach is set by the amount of energy stored in the inductance of primary winding 32 and the storage capacitor 55 when the transistor 31 is turned off. This tank circuit resonates and, in FIG. 2, the graph 55' shows the current through the storage capacitor 55 from time $t_1$ to time $t_2$.

Near the end of this resonating stage, the voltage levels provided by the feedback winding 35 are again in a direction to turn on the transistor 31. This will be at a time $t_2$, shown on the graph 56 of FIG. 2. For the oscillator to work properly, it is imperative that the base-emitter of the transistor 31 not become forward-biased until the clamp stage or clamp portion of the cycle begins. The necessary time delay comes from two different sources. The first source is a negative offset voltage provided by the level shift action of the diodes 52 and 53 and bias capacitor 51. The second source is from the capacitor 41. The value of this capacitor 41 is selected to provide enough time delay to prevent turn-on of the transistor 31 during the time interval where the voltage across the primary winding 32 increases in the positive direction from zero to the clamp voltage. This time delay is shown as a delay TD in the graph 58 of the base voltage shown in FIG. 2.

Figure 2:
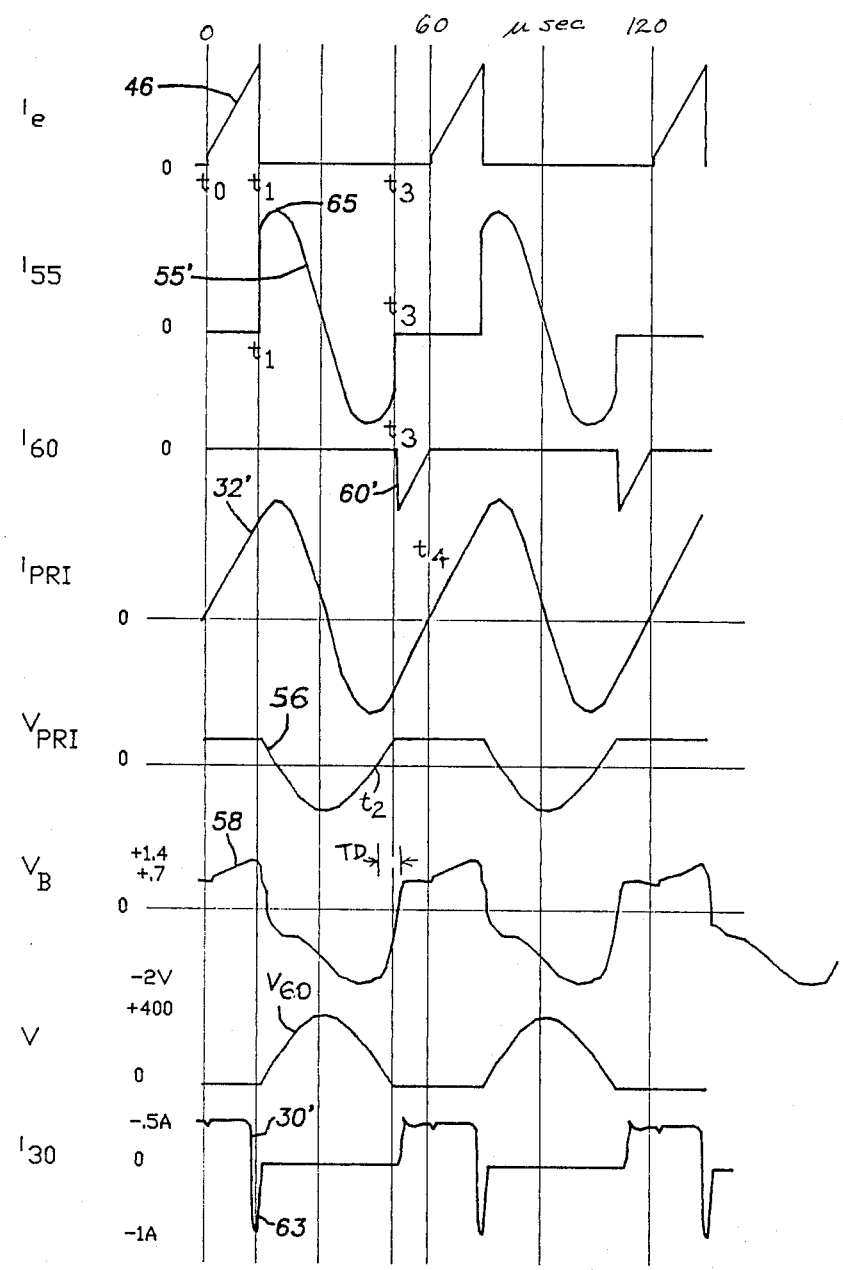
FIG. 2 is a composite of voltage and current waveforms illustrating the operation of the circuit.

The clamp stage or clamp portion of the operation cycle begins at time $t_3$ as a clamp diode 60 connected effectively across the transistor 31 becomes forward-biased. During this portion of the cycle, the excess energy stored in the tank circuit 32, 55 is returned to the input and stored in the filter capacitor 12. This clamp diode current $i_{60}$ is shown by the graph 60' (in FIG. 2). These three portions of the cycle of operation result in a primary current shown by a graph 32' in FIG. 2. The clamp diode 60 limits the voltage across the primary winding 32 and storage capacitor 55 to that of the voltage across the filter capacitor 12 plus the forward voltage drop of the clamp diode 60. This is shown in the graph 56 of FIG. 2. A comparison of graph 56 with graph 58 shows that the clamp occurs at time $t_3$, whereas the voltage on the base of transistor 31 does not make this transistor forward-biased until the given time delay TD later than time $t_2$. This clamping action protects the transistor 31 from unsafe reverse bias conditions. The diode 33 prevents inversion of the transistor 31 during this clamp stage of operation. Also during this clamp stage, the voltage levels from the feedback winding 35 succeed in forward-biasing the base-emitter of transistor 31. Therefore, when the current in the primary winding 32 reaches zero at time $t_4$, shown in graph 32' of FIG. 2, the transistor 31 is immediately able to begin the conducting stage again. A graph $V_{60}$, in FIG. 2 shown the voltage across the clamp diode 60, which generally is the inverse of the voltage across the primary winding 32. A graph 30' shows the current in the base 30. A portion 63 of this graph shows where the base current is driven sharply negative at time $t_1$ at the beginning of the resonant stage, which rapidly drives the transistor into a turnoff condition. Previous to this time, the transistor has been saturated.

Some of the prior art references have utilized the transition of the power transistor from saturated condition to active region to initiate cutoff. This is considered inferior to the present application because it is sensitive to the voltage input. The present invention will cut off at approximately the same emitter current even though the AC input voltage at terminals 22 is varied from 80 to 132 volts AC. This regulation is a prime feature of the current mode control of the present invention, and is not found in the cited references.

The present invention, therefore, has an efficient switching circuit because the first semiconductor 31 is turned off extremely rapidly while it is still in a saturated condition, rather than after a transition from the saturated condition to an active region. As shown by a comparison of the graphs 46 and 55' on FIG. 2, it will be seen that this rapid cutoff allows the current in the tank circuit to increase even after time $t_1$ to a peak at a point 65 on the graph 55'. The hard driving of the transistor 31 and the rapid cutoff thus is the reason for the high efficiency of the present resonant inverter.

The values of components in a circuit constructed to actually utilize the invention were as follows:

TABLE A

| Resistors | | | Capacitors | |
|---|---|---|---|---|
| 23 | 2SS80 | | 12 | 220 mf, 200 V. |
| 32 | 68K | | 24, 25, 27 | 5600 pf, |
| 34 | .22 ohms | | 26 | .068 mf |
| 36 | 10 ohms | | 41 | 1.33 mf |
| 38 | 100 ohms | | 51 | 10 mf |
| 49 | 10 ohms | | 55 | .1 mf |
| 73 | 470 ohms | | | |
| | | | Rectifiers | |
| | | | 21 | IN 4004 |
| | | | 33 | UF 4003 |
| | | | 37 | UF 4003 |
| | | | 40 | IN 4148 |
| | | | 52, 53 | IN 4004 |
| | | | 60 | MUR 1100 |
| | | | 74 | IN 4734A |
| Inductance | | | Semiconductors | |
| 28 | P 104 | | 31 | MJE 16002 |
| | | | 48 | MCR 103 |
| Transformers | | | | |
| 13 | Ferrite Rod .5" × 2.75" | | | |
| 32 | Primary 105 turns 10/30 LITZ | | | |
| | Secondary 3040 turns #39 | | | |
| 35 | Feedback 6 turns #24 | | | |
| *70 | 72/71 = 5:1 turns ratio, Ferrite Toroid 768XT188 | | | |

Figure 3:
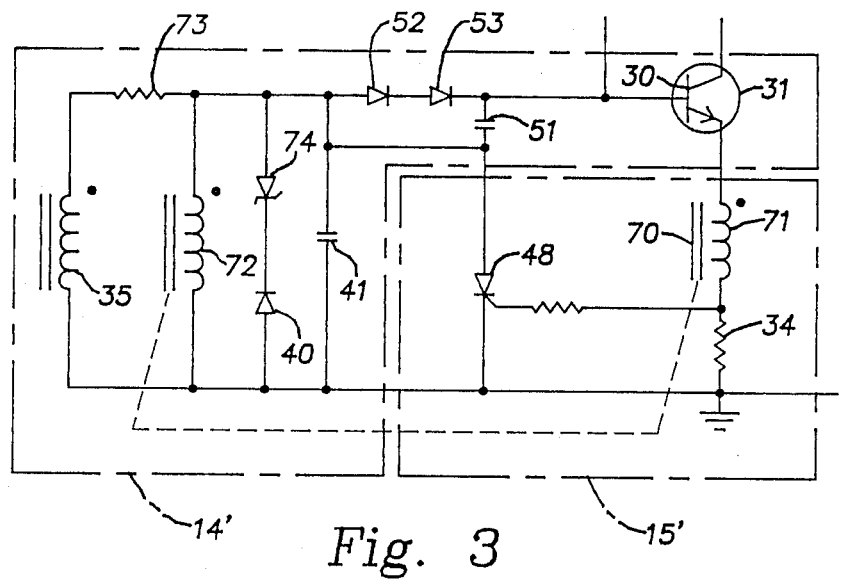
FIG. 3 is a schematic diagram of a modification of the resonating means.

FIG. 3 shows modification of the conducting means 14' and the resonating means 15'. Where the same components and component values have been utilized as in FIG. 1, the same reference numerals have been utilized. The principal difference between FIG. 1 and FIG. 3 is the addition in FIG. 3 of a current transformer 70 having a primary 71 and a secondary 72. This current transformer is optional, and in FIG. 3 the base drive current will be proportional to the emitter current. With the inclusion of this current transformer, the current limit resistor 73 is made a larger value. An optional Zener diode 74 is connected in series with the protective diode 40.

In both circuits of FIGS. 1 and 3, the time delay TD shown in FIG. 2 is between the transistor driving voltage and the base voltage $V_B$. There are two sources for this, the first being the time delay due to the low pass filtering action of resistor 36 or 73 and capacitor 41, and the second being the voltage level shift action of diodes 37, 52, and 53. Another important feature of the invention is that the turnoff of the transistor 31 is at a constant peak current set by the value of the current sense resistor and the trigger voltage of the thyristor 48. This constant peak current results in a constant energy storage in the magnetizing inductance of the primary 32. This causes a constant power output (line regulation) to the load.

The diodes 52 and 53 are a form of voltage dropping means to establish the charging voltage across the bias capacitor 51. The number of such diodes may be adjusted to set the desired charging voltage. The voltage of this bias capacitor is applied as a negative bias to the base 30 of the transistor 31 to force it off extremely rapidly. The time delay capacitor 41 is connected effectively in parallel with the second semiconductor to assure that the clamping portion of the cycle will commence prior to the termination of the negative bias. In FIG. 1, the effective parallel connection is through the current sense resistor 34, and the resistance value thereof is quite low. In both circuits of FIGS. 1 and 3, the diodes 52, 53 and capacitors 41 and 51 are a means to assure that the first semiconductor 31 will not become forward-biased for conduction until subsequent to the commencement of the clamping portion of the cycles. In both circuits, the clamping diode 60 is a unidirectional connecting means connected in reverse polarity across the series combination of the diode 33 and first semiconductor 31.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and the scope of the invention as hereinafter claimed.

What is claimed is:

1. A resonant inverter comprising, in combination:
   input terminals energizable from a DC supply source and having a filter capacitor;
   an energy storage transformer having a primary winding;
   means to obtain an output from said transformer;
   conducting, resonating, and clamping means connected to said transformer primary winding to established sequentially conducting, resonating, and clamping portions of repetitive cycles of operation, respectively;
   said conducting means including a first semiconductor connected to said primary winding to conduct current therethrough;
   said resonating means connected to resonate the energy in said primary winding including a storage capacitor connected to said primary winding;
   a second semiconductor having a control element;
   means responsive to the current of said first semiconductor to turn on said second semiconductor and to turn off said first semiconductor;
   said resonating means reversing the current in said primary winding and establishing the energy stored in the inductance of the primary winding being released into said storage capacitor; and
   said clamping means including unidirectional conducting means connected to establish a time for excess energy stored in the tank circuit composed of said primary winding and said storage capacitor to return to the input and be stored in said filter capacitor.

2. A resonant inverter as set forth in claim 1, wherein said second semiconductor is a thyristor.

3. A resonant inverter as set forth in claim 2, including a gate on said thyristor and a current sensing impedance connected responsive to current flow through said first semiconductor to control said gate.

4. A resonant inverter as set forth in claim 1, including a control electrode on said first semiconductor, and a bias capacitor connected between a transformer feedback winding and said control electrode.

5. A resonant inverter as set forth in claim 4, including a voltage dropping means connected across said bias capacitor to establish a charging voltage thereof.

6. A resonant inverter as set forth in claim 5, wherein said voltage dropping means is diode means.

7. A resonant inverter as set forth in claim 5, including means connecting said second semiconductor to said bias capacitor to apply the voltage of said bias capacitor to said first semiconductor.

8. A resonant inverter as set forth in claim 7, wherein said connecting means applies the voltage of said bias capacitor as a negative bias to said first semiconductor to turn it off upon said second semiconductor becoming conductive.

9. A resonant inverter as set forth in claim 8, including a time delay capacitor connected effectively in parallel with said second semiconductor to assure that said clamping portion of the cycle will commence prior to the termination of the negative bias.

10. A resonant inverter as set forth in claim 1, including means to assure that said first semiconductor will not become forward-biased for conduction until subsequent to the commencement of said clamping portion of the cycles.

11. A resonant inverter as set forth in claim 9, wherein said assurance means includes capacitive means effecting a time delay.

12. A resonant inverter as set forth in claim 1, including a current transformer connected responsive to the current through said first semiconductor and having an output connected to control the drive current through said first semiconductor.

13. A resonant inverter as set forth in claim 1, including a first diode connected in series with said first semiconductor, and said unidirectional conducting means being connected in reverse polarity across the series combination of said first diode and said first semiconductor.

14. A resonant inverter as set forth in claim 12, wherein said unidirectional conducting means is a clamp diode.

15. A resonant inverter as set forth in claim 1, wherein said current-responsive means is responsive to the magnitude of the first semiconductor current during saturation.

* * * * *

UNITED STATES PATENT AND TRADEMARK OFFICE
CERTIFICATE OF CORRECTION

PATENT NO. : 4,858,099

DATED : August 15, 1989

INVENTOR(S) : Thomas A. McMillan, et al.

It is certified that error appears in the above-identified patent and that said Letters Patent is hereby corrected as shown below:

Column 5, line 54, "established" should be --establish--.

Signed and Sealed this

Fifth Day of June, 1990

Attest:

HARRY F. MANBECK, JR.

*Attesting Officer*  *Commissioner of Patents and Trademarks*